(12) United States Patent
Huang et al.

(10) Patent No.: US 9,538,535 B2
(45) Date of Patent: Jan. 3, 2017

(54) CROSS-BAND RATE ADAPTION

(71) Applicant: QUALCOMM Incorporated, San Diego, CA (US)

(72) Inventors: Xiaolong Huang, San Jose, CA (US); Tevfik Yucek, San Jose, CA (US); Srinivas Katar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 14/708,743

(22) Filed: May 11, 2015

(65) Prior Publication Data

US 2016/0338059 A1    Nov. 17, 2016

(51) Int. Cl.
| | |
|---|---|
| H04W 4/00 | (2009.01) |
| H04B 7/216 | (2006.01) |
| H04W 72/04 | (2009.01) |
| H04W 24/02 | (2009.01) |
| H04W 84/12 | (2009.01) |

(52) U.S. Cl.
CPC ......... H04W 72/0453 (2013.01); H04W 24/02 (2013.01); *H04W 84/12* (2013.01)

(58) Field of Classification Search
CPC ...... H04W 24/00; H04W 48/08; H04W 72/02; H04W 36/30
See application file for complete search history.

(56) References Cited

U.S. PATENT DOCUMENTS

| | | | |
|---|---|---|---|
| 8,705,451 B2 | 4/2014 | Song et al. | |
| 8,706,124 B2 * | 4/2014 | Kakani | H04L 1/0022 455/179.1 |
| 2002/0173312 A1 * | 11/2002 | Takano | H04L 1/0009 455/452.1 |
| 2004/0028011 A1 * | 2/2004 | Gehring | H04B 1/719 370/330 |
| 2004/0048574 A1 * | 3/2004 | Walker | H03K 3/0315 455/63.1 |
| 2008/0233901 A1 * | 9/2008 | Ebiko | H04L 27/2624 455/114.2 |
| 2009/0010211 A1 * | 1/2009 | Sumasu | H04L 1/0003 370/329 |

(Continued)

FOREIGN PATENT DOCUMENTS

WO    WO-2010068066 A2    6/2010

OTHER PUBLICATIONS

International Search Report and Written Opinion—PCT/US2016/027626—ISA/EPO—Jul. 7, 2016.

(Continued)

*Primary Examiner* — Melanie Jagannathan
(74) *Attorney, Agent, or Firm* — Paradice and Li LLP

(57) ABSTRACT

A system and method are disclosed that may allow a STA to selectively change frequency bands from an operating band to a candidate band based on operating conditions. In response to determining that a channel condition is within a band switch region associated with a candidate band, the STA may select the candidate band and temporarily switch to it. The STA may select an initial modulation and coding scheme for the candidate band and probe the candidate band with data to determine an estimate of candidate band goodput. If the estimate of candidate band goodput is greater than the operating band goodput, the STA may switch to the candidate band.

23 Claims, 10 Drawing Sheets

(56) References Cited

U.S. PATENT DOCUMENTS

| | | |
|---|---|---|
| 2010/0190457 A1* | 7/2010 | Tu .................. H04B 17/336 |
| | | 455/115.4 |
| 2010/0330914 A1 | 12/2010 | Chandra |
| 2011/0070842 A1* | 3/2011 | Kwon ................ H04W 36/30 |
| | | 455/67.13 |
| 2011/0158110 A1* | 6/2011 | Stacey ............... H04W 24/00 |
| | | 370/252 |
| 2012/0002103 A1* | 1/2012 | Shao ............ H04N 21/43637 |
| | | 348/388.1 |
| 2012/0163345 A1* | 6/2012 | Camarillo .......... H04W 36/023 |
| | | 370/333 |
| 2013/0078925 A1* | 3/2013 | Aguirre ............... H04W 4/021 |
| | | 455/62 |
| 2013/0155990 A1 | 6/2013 | Nishio et al. |
| 2013/0266136 A1* | 10/2013 | Chu .................. H04K 1/003 |
| | | 380/34 |
| 2014/0160947 A1 | 6/2014 | Du et al. |
| 2014/0169255 A1 | 6/2014 | Zhang et al. |
| 2014/0269468 A1* | 9/2014 | Jia .................. H04W 24/02 |
| | | 370/311 |
| 2014/0269655 A1* | 9/2014 | Du .................. H04W 28/0231 |
| | | 370/338 |
| 2015/0016246 A1 | 1/2015 | Morita et al. |
| 2015/0350933 A1* | 12/2015 | Mannemala .......... H04W 24/04 |
| | | 370/225 |
| 2016/0044711 A1* | 2/2016 | Lou .................. H04W 74/0816 |
| | | 370/338 |

OTHER PUBLICATIONS

Rahul H., et al., "Frequency-Aware Rate Adaptation and MAC Protocols," Proceedings of the 15th Annual International Conference on Mobile Computing and Networking, 2009, pp. 193-204.

* cited by examiner

| MCS index | Number of Spatial Streams | Modulation Type | Coding Rate | Data Rate (Mb/s) | | | |
|---|---|---|---|---|---|---|---|
| | | | | 20 MHz Channel | | 40 MHz Channel | |
| | | | | 800 ns GI | 400 ns GI | 800 ns GI | 400 ns GI |
| 0 | 1 | BPSK | 1/2 | 6.5 | 7.2 | 13.5 | 15 |
| 1 | 1 | QPSK | 1/2 | 13 | 14.4 | 27 | 30 |
| 2 | 1 | QPSK | 3/4 | 19.5 | 21.7 | 40.5 | 45 |
| 3 | 1 | 16-QAM | 1/2 | 26 | 28.9 | 54 | 60 |
| 4 | 1 | 16-QAM | 3/4 | 39 | 43.3 | 81 | 90 |
| 5 | 1 | 64-QAM | 2/3 | 52 | 57.8 | 108 | 120 |
| 6 | 1 | 64-QAM | 3/4 | 58.5 | 65 | 121.5 | 135 |
| 7 | 1 | 64-QAM | 5/6 | 65 | 72.2 | 135 | 150 |
| 8 | 2 | BPSK | 1/2 | 13 | 14.4 | 27 | 30 |
| 9 | 2 | QPSK | 1/2 | 26 | 28.9 | 54 | 60 |
| 10 | 2 | QPSK | 3/4 | 39 | 43.3 | 81 | 90 |
| 11 | 2 | 16-QAM | 1/2 | 52 | 57.8 | 108 | 120 |
| 12 | 2 | 16-QAM | 3/4 | 78 | 86.7 | 162 | 180 |
| 13 | 2 | 64-QAM | 2/3 | 104 | 115.6 | 216 | 240 |
| 14 | 2 | 64-QAM | 3/4 | 117 | 130 | 243 | 270 |
| 15 | 2 | 64-QAM | 5/6 | 130 | 144.4 | 270 | 300 |
| 16 | 3 | BPSK | 1/2 | 19.5 | 21.7 | 40.5 | 45 |
| 17 | 3 | QPSK | 1/2 | 39 | 43.3 | 81 | 90 |
| 18 | 3 | QPSK | 3/4 | 58.5 | 65 | 121.5 | 135 |
| 19 | 3 | 16-QAM | 1/2 | 78 | 86.7 | 162 | 180 |
| 20 | 3 | 16-QAM | 3/4 | 117 | 130 | 243 | 270 |
| 21 | 3 | 64-QAM | 2/3 | 156 | 173.3 | 324 | 360 |
| 22 | 3 | 64-QAM | 3/4 | 175.5 | 195 | 364.5 | 405 |
| 23 | 3 | 64-QAM | 5/6 | 195 | 216.7 | 405 | 450 |
| 24 | 4 | BPSK | 1/2 | 26 | 28.8 | 54 | 60 |
| 25 | 4 | QPSK | 1/2 | 52 | 57.6 | 108 | 120 |
| 26 | 4 | QPSK | 3/4 | 78 | 86.8 | 162 | 180 |
| 27 | 4 | 16-QAM | 1/2 | 104 | 115.6 | 216 | 240 |
| 28 | 4 | 16-QAM | 3/4 | 156 | 173.2 | 324 | 360 |
| 29 | 4 | 64-QAM | 2/3 | 208 | 231.2 | 432 | 480 |
| 30 | 4 | 64-QAM | 3/4 | 234 | 260 | 486 | 540 |
| 31 | 4 | 64-QAM | 5/6 | 260 | 288.8 | 540 | 600 |

| MCS index | Modulation Type | Coding Rate | 20 MHz channel 800 ns GI | 20 MHz channel 400 ns GI | 40 MHz channel 800 ns GI | 40 MHz channel 400 ns GI |
|---|---|---|---|---|---|---|
| 0 | BPSK | 1/2 | 6.5 | 7.2 | 13.5 | 15 |
| 1 | QPSK | 1/2 | 13 | 14.4 | 27 | 30 |
| 2 | QPSK | 3/4 | 19.5 | 21.7 | 40.5 | 45 |
| 3 | 16-QAM | 1/2 | 26 | 28.9 | 54 | 60 |
| 4 | 16-QAM | 3/4 | 39 | 43.3 | 81 | 90 |
| 5 | 64-QAM | 2/3 | 52 | 57.8 | 108 | 120 |
| 6 | 64-QAM | 3/4 | 58.5 | 65 | 121.5 | 135 |
| 7 | 64-QAM | 5/6 | 65 | 72.2 | 135 | 150 |
| 8 | 256-QAM | 3/4 | 78 | 86.7 | 162 | 180 |

CROSS-BAND RATE ADAPTION

TECHNICAL FIELD

The example embodiments relate generally to wireless networks, and specifically to wireless devices determining whether to switch between frequency bands.

BACKGROUND OF RELATED ART

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. In a typical WLAN, only one STA may use the wireless medium at any given time, and each STA may be associated with only one AP at a time. Due to the increasing ubiquity of wireless networks, when a STA seeks to join a wireless network, the STA may have a choice between multiple wireless networks and/or between multiple APs that form an extended BSS. As the STA is moved into the coverage area of one or more wireless networks, the STA may select the best AP with which to associate. After the STA becomes associated with the selected AP, the STA may be moved within and/or between the coverage area of the one or more wireless networks, and may subsequently benefit from switching its association from the currently associated AP to one of a number of candidate APs (e.g., APs with which the STA is not associated).

Some APs and STAs are capable of operating on a number of different frequency bands. For example, some APs and STAs may operate on frequency bands centered at approximately 900 MHz, 2.4 GHz, 5 GHz, 60 GHz, and/or other frequency bands. Accordingly, it is desirable for the STA to determine the best available AP with which to associate and/or to determine the best frequency band upon which to operate.

BRIEF DESCRIPTION OF THE DRAWINGS

The example embodiments are illustrated by way of example and are not intended to be limited by the figures of the accompanying drawings, where.

Like reference numerals refer to corresponding parts throughout the drawing figures.

DETAILED DESCRIPTION

Figure 1:
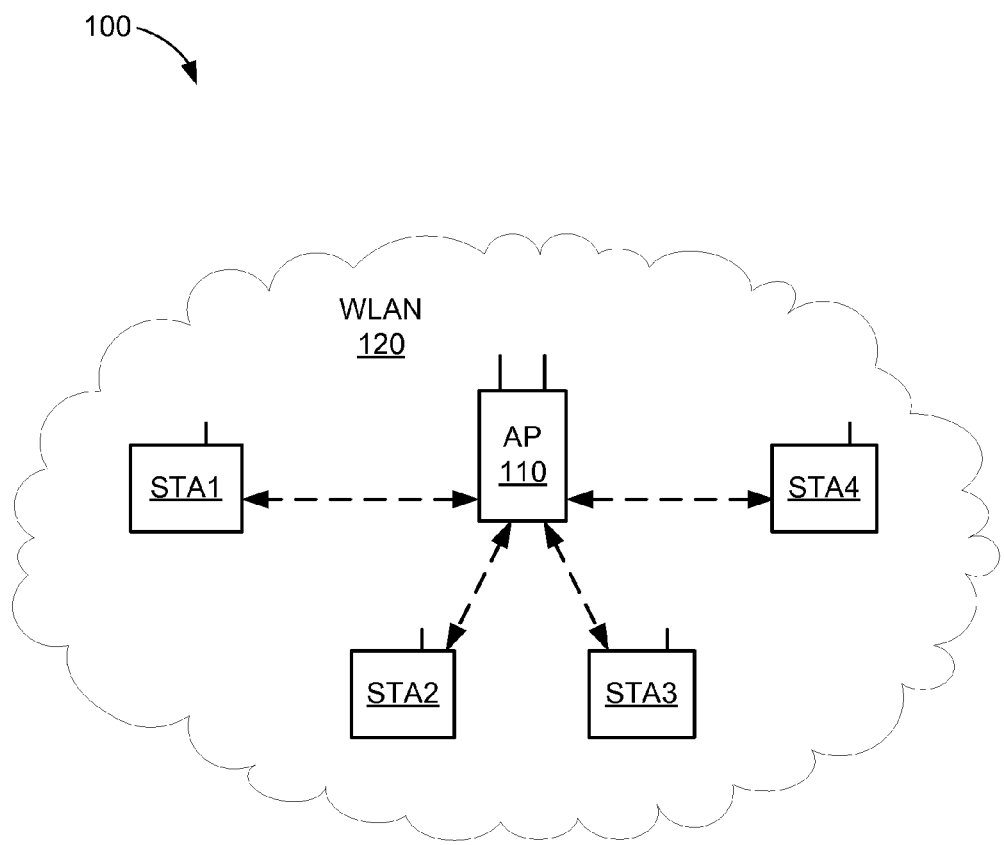
FIG. 1 shows a block diagram of a wireless system within which the example embodiments may be implemented.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components.

The term "associated AP" refers to an AP with which a given STA is associated (e.g., there is an established communication channel or link between the AP and the given STA). The term "non-associated AP" refers to an AP with which a given STA is not associated (e.g., there is not an established communication channel or link between the AP and the given STA, and thus the AP and the given STA may not yet exchange data frames). The non-associated APs may also be referred to herein as "candidate APs," and thus the terms "non-associated AP" and "candidate AP" may be used interchangeably herein. The frequency band currently used by the STA (e.g., to communicate with the associated AP) may be referred to herein as the "current frequency band." The frequency band used by a candidate AP may be referred to herein as the "candidate frequency band."

Further, the terms "goodput" and "throughput" may refer to an effective data rate of a wireless channel or link between two wireless devices (e.g., between a STA and an AP). The term "goodput" may be used interchangeably with the term "throughput" in the following description. For example embodiments, the goodput value of an AP may be indicative of the available bandwidth or medium share of a wireless channel upon which the AP operates. The term "sounding packet" may refer to a frame or packet that includes a predetermined pattern of information (e.g., a training sequence) that is known to a receiving device and that may be used as a basis for estimating channel conditions and/or goodput values of APs. For example, a null data packet (NDP), which does not contain data, may be used as a sounding packet. Thus, the term "NDP" may be used interchangeably with the term "sounding packet."

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The example embodiments are not to be construed as limited to specific examples described herein but rather to include within their scopes all embodiments defined by the appended claims.

As mentioned above, when a wireless device such as a STA is moved into the coverage area of one or more wireless networks, it may be desirable for the STA to select the best available AP with which to associate. As used herein, the term "best available AP" may refer to the AP that provides the highest goodput (e.g., as compared with the goodput of other nearby candidate APs). After the STA becomes associated with a particular AP, it may be desirable for the STA to continually (e.g., periodically) scan or probe the surrounding environment to determine whether one or more candidate APs offer the STA better goodput than the AP with which the STA is currently associated. In addition, because the STA may operate on a number of different frequency bands, it is desirable for the STA to not only scan for candidate APs on multiple channels within a given frequency band, but also to scan for candidate APs on multiple frequency bands (e.g., on the 900 MHz, 2.4 GHz, 5 GHz, and/or 60 GHz frequency bands).

Because many APs have dual-band capabilities, it may also be desirable for the STA to scan other frequency bands provided by the associated AP. For example, dual-band APs that are compliant with the IEEE 802.11 ac standards may simultaneously operate on the 2.4 GHz and 5 GHz frequency bands. A STA that is currently associated with such a dual-band AP on one frequency band may obtain better goodput from the same AP on another frequency band for a number of reasons including (but not limited to) channel conditions, traffic on the wireless medium, and distance from the AP. For one example, because higher-frequency wireless signals typically have shorter range than lower-frequency wireless signals, a STA that is moving away from a dual-band AP may obtain better throughput by switching from the 5 GHz frequency band to the 2.4 GHz frequency band. For another example, although higher-frequency wireless signals may have higher data rates than lower-frequency wireless signals, if the 5 GHz frequency band is congested, then the STA may obtain better throughput by switching from the 5 GHz frequency band to the 2.4 GHz frequency band (e.g., if the 2.4 GHz frequency band is less congested than the 5 GHz frequency band).

Thus, it would be desirable to allow a wireless device to dynamically switch between different frequency bands to achieve the highest possible data transmission rates while minimizing the overhead associated with probing other frequency bands and/or while minimizing the overhead associated with switching between different frequency bands. These are some of the technical problems to be solved by the example embodiments, as described below.

An apparatus and method are disclosed that may allow a wireless device such as a station (STA) to determine whether increased goodput may be obtained by switching operation from one frequency band to another frequency band with minimal overhead. For some embodiments, a wireless device may selectively switch its operating frequency from a current frequency band to a selected candidate frequency band based at least in part on channel conditions on the current frequency band and/or on an estimated goodput value of the selected candidate frequency band. The channel conditions, which may include (but not limited to) attributes such as interference, traffic on the wireless medium, multipath effects, and the number of active users on the channel, may affect data rates on the wireless medium, and therefore may affect the goodput of APs operating on a given frequency band. If channel conditions deteriorate on the current frequency band, it may be desirable to scan or probe a number of candidate frequency bands to determine whether better goodput may be obtained by switching frequency bands to one of the candidate frequency bands.

Probing other frequency bands to determine channel conditions or to estimate goodput is time intensive and consumes limited bandwidth of the shared wireless medium. Similarly, switching frequency bands consumes time, and may temporarily interrupt data transmissions of the wireless device (e.g., particularly if the wireless device does not have dual-band capabilities or does not have MIMO capabilities). The example embodiments may reduce the overhead associated with frequency band switching by probing other frequency bands only when channel conditions of the current frequency band fall within a band switch region (BSR) associated with a candidate frequency band. If the current channel conditions fall within one or more band switch regions, then the wireless device may probe one or more associated candidate frequency bands to estimate their goodput values. Thereafter, the wireless device may switch operation to a selected candidate frequency band if the goodput of the selected candidate frequency band is better than the goodput of the current frequency band.

After the wireless device switches to the selected candidate frequency band, the wireless device may be prevented from initiating probing operations on other frequency bands for a period of time, for example, to reduce the overhead associated with frequency band switching. For some embodiments, the wireless device may set a timer or counter upon switching to the candidate frequency band, and then wait until the timer or counter reaches a minimum value (e.g., zero) before probing other frequency bands. This may reduce the extent to which short-term changes in channel conditions cause the wireless device to oscillate between different frequency bands.

Further, for at least some embodiments, the wireless device may, after switching to the selected candidate frequency band, modify the band switch region associated with the selected candidate frequency band in a manner that reduces the likelihood of switching back to the previous frequency band in response to relatively small and/or short-term changes in channel conditions (e.g., by adding hysteresis to the band switch region).

Conversely, if the current channel conditions do not fall within one or more band switch regions, then the wireless device may not probe other candidate frequency bands. In this manner, probing operations on other frequency bands may be reduced, for example, as compared to wireless devices that probe other frequency bands at regular intervals and/or without regard to channel conditions on the current frequency band. Reducing the frequency of probing operations on other frequency bands may, in turn, reduce the amount of time and resources diverted from normal operations of the wireless device.

The example embodiments may also reduce the overhead associated with frequency band switching by preventing probing operations on other frequency bands and/or preventing a switch to a selected candidate frequency band if the data rate of the current frequency band is increasing, even if the current channel conditions fall within one of the band switch regions. More specifically, if the wireless device determines that its MCS value has increased by more than an MCS threshold value and/or that the PER value has decreased by more than a PER threshold value within a duration of time (e.g., which may indicate that channel conditions on the current frequency band are improving), then the wireless device may decide to forgo probing operations on other frequency bands or to forgo switching to a selected candidate frequency band.

For some embodiments, the wireless device may store information defining one or more band switch regions, where each band switch region may be associated with a frequency band switch to a corresponding candidate frequency band. More specifically, the information defining a band switch region may indicate a data rate or a range of data rates of the current frequency band that, if satisfied by current channel conditions, may allow the wireless device to probe an associated candidate frequency band. The range of data rates for a given band switch region may be indicated by modulation and coding scheme (MCS) values, received signal strength indicator (RSSI) values, packet error rate (PER) values, and/or any other data rate or transmission speed metric. Thus, although the example wireless devices are primarily described herein as comparing currently used MCS values with stored MCS values to determine whether current channel conditions fall within a band switch region, other indicators of wireless data rates may be used to determine whether current channel conditions fall within a band switch region.

As mentioned above, the MCS value used by a wireless device may indicate the data rate associated with transmissions on the wireless medium. More specifically, the MCS value may indicate the type of modulation used by the wireless device, may indicate the coding rate used by the wireless device, and/or may indicate the number of spatial streams supported by the wireless device. The wireless device may estimate an expected data rate based at least in part on MCS values, the channel bandwidth, and the guard interval of the wireless channel.

For at least some example embodiments, each band switch region may be defined by an upper MCS boundary level and a lower MCS boundary level. The upper and lower MCS boundary levels may indicate a range of data rates of the current frequency band for which a switch to another frequency band may be considered. As described in more detail below, the upper MCS boundary level may be used to trigger probing a candidate frequency band that occupies a lower frequency range than the current frequency band, and the lower MCS boundary level may be used to trigger probing a candidate frequency band that occupies a higher frequency range than the current frequency band.

Wireless devices may inform each other of their currently used MCS values. For one example, wireless devices operating in accordance with the IEEE 802.11n standards may exchange physical layer convergence protocol (PLOP) frames that include a High Throughput (HT) Signal field that stores a 7-bit MCS value. The 7-bit MCS value indicates the modulation scheme used by the wireless device, the coding rate of the wireless device, and the number of spatial streams supported by the wireless device. Thus, an IEEE 802.11n-compliant wireless device may indicate its MCS value to other wireless devices by storing one of 32 predetermined values in the 7-bit MCS field of the PLOP frames.

For another example, wireless devices operating in accordance with the IEEE 802.11ac standards may exchange PLOP frames including Very High Throughput (VHT) Signal A (SIG-A) and VHT signal B (SIG-B) fields. Each of the VHT SIG-A and VHT SIG-B fields may store a 4-bit MCS value for a respective user (e.g., for a respective STA). The 4-bit MCS value may indicate the modulation type, the coding rate, and the number of spatial streams field for the respective user. Wireless devices that operate according to the IEEE 802.11n protocols may indicate their MCS values to other wireless devices by storing one of 9 values as the 4-bit MCS value in the PLOP frames.

To maximize goodput of a frequency band, a wireless device may select the MCS having the highest estimated goodput for the given frequency band. The goodput of a frequency band may be estimated using any suitable techniques. The wireless device may estimate channel conditions on a given frequency band using one or more of a received signal strength indicator (RSSI) value (e.g., of a given nearby AP), a modulation and coding scheme (MCS) value, and a packet error rate (PER) value. For one example, the wireless device may measure the RSSI value and determine whether the measured RSSI value falls within a BSR. For another example, the wireless device may determine whether its currently used MCS value falls within a BSR. For yet another example, the wireless device may determine whether its PER value falls within a BSR.

Alternatively, the wireless device may directly measure the goodput of an AP on a given frequency band by exchanging a number of data frames with the AP, and then measuring the effective data rate of the frames received from the AP. The wireless device may also estimate the goodput of an AP on a given frequency band by participating in channel sounding operations with the AP. For example, the AP may send a NDP to the wireless device, and the wireless device may determine the data rate of the given frequency band by dividing the size of the NDP by the transmit time of the NDP.

The channel conditions of a candidate frequency band, as determined by the wireless device, may fall within more than one band switch region. For some embodiments, if the determined channel conditions fall within more than one band switch region, the wireless device may probe only the associated candidate frequency band that is adjacent in frequency to the current frequency band. For example, a wireless device currently operating on the 5 GHz frequency band may determine that channel conditions of the 5 GHz frequency band fall within both (i) a BSR associated with a 2.4 GHz band and (ii) a BSR associated with a 900 MHz band. For this example, the wireless device may select only the 2.4 GHz band for probing operations because the 2.4 GHz frequency band is adjacent to the 5 GHz frequency band (e.g., and the 900 MHz frequency band is not adjacent to the 5 GHz frequency band). In this manner, the overhead associated with probing operations may be reduced by probing only one candidate frequency band.

When probing a candidate frequency band, the wireless device may select an initial MCS value for exchanging data frames with other wireless devices on the candidate frequency band. For example embodiments, the initial MCS value for the candidate frequency band may be stored in the wireless device. More specifically, the initial MCS value stored in the wireless device may be one of the MCS values that define the corresponding band switch region, or may be an MCS value that resulted in an acceptable goodput value (e.g., a goodput value that is greater than a threshold goodput value) during a previous probing operation on the candidate frequency band. If no initial MCS value is stored for the candidate frequency band, then the wireless device may select the highest MCS value for the candidate frequency band as the initial MCS value. The highest MCS value may be selected because switching from a higher MCS value to a lower MCS value typically requires less time than switching from a lower MCS value to a higher MCS value.

These and other details of the example embodiments, which provide one or more technical solutions to the aforementioned technical problems, are described in more detail below.

FIG. 1 shows a block diagram of an example wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by any number of APs that may operate according to the IEEE 802.11 family of standards (or according to other suitable wireless protocols). The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of STA1-STA4 is also assigned a unique MAC address. For some embodiments, the wireless system 100 may correspond to a multi-user multiple-input multiple-output (MU-MIMO) wireless network (e.g., as defined by the IEEE 802.11ac specification). Further, although the WLAN 120 is depicted in FIG. 1 as an infrastructure BSS, for other example embodiments, WLAN 120 may be an IBSS, an ad-hoc network, or a peer-to-peer (P2P) network (e.g., operating according to the Wi-Fi Direct protocols).

The stations STA1-STA4 may be any suitable Wi-Fi enabled wireless device including, for example, a cell phone, personal digital assistant (PDA), tablet device, laptop computer, or the like. The stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, the stations STA1-STA4 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 7.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, a network interface, one or more processing resources, and one or more memory resources. The memory resources may include a non-transitory computer-readable medium (e.g., one or more non-volatile memory elements, such as EPROM, EEPROM, Flash memory, a hard drive, etc.) that stores instructions for performing operations described operations described above or below with respect to FIG. 7.

For the stations STA1-ST4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 900 MHz frequency band, within a 2.4 GHz frequency band, within a 5 GHz frequency band, and/or within a 60 GHz frequency band in accordance with various protocols of the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the STA may be any technically feasible transceiver such as a ZigBee transceiver described by a specification from the ZigBee specification, a WiGig transceiver, and/or a HomePlug transceiver described a specification from the HomePlug Alliance.

Figure 2:
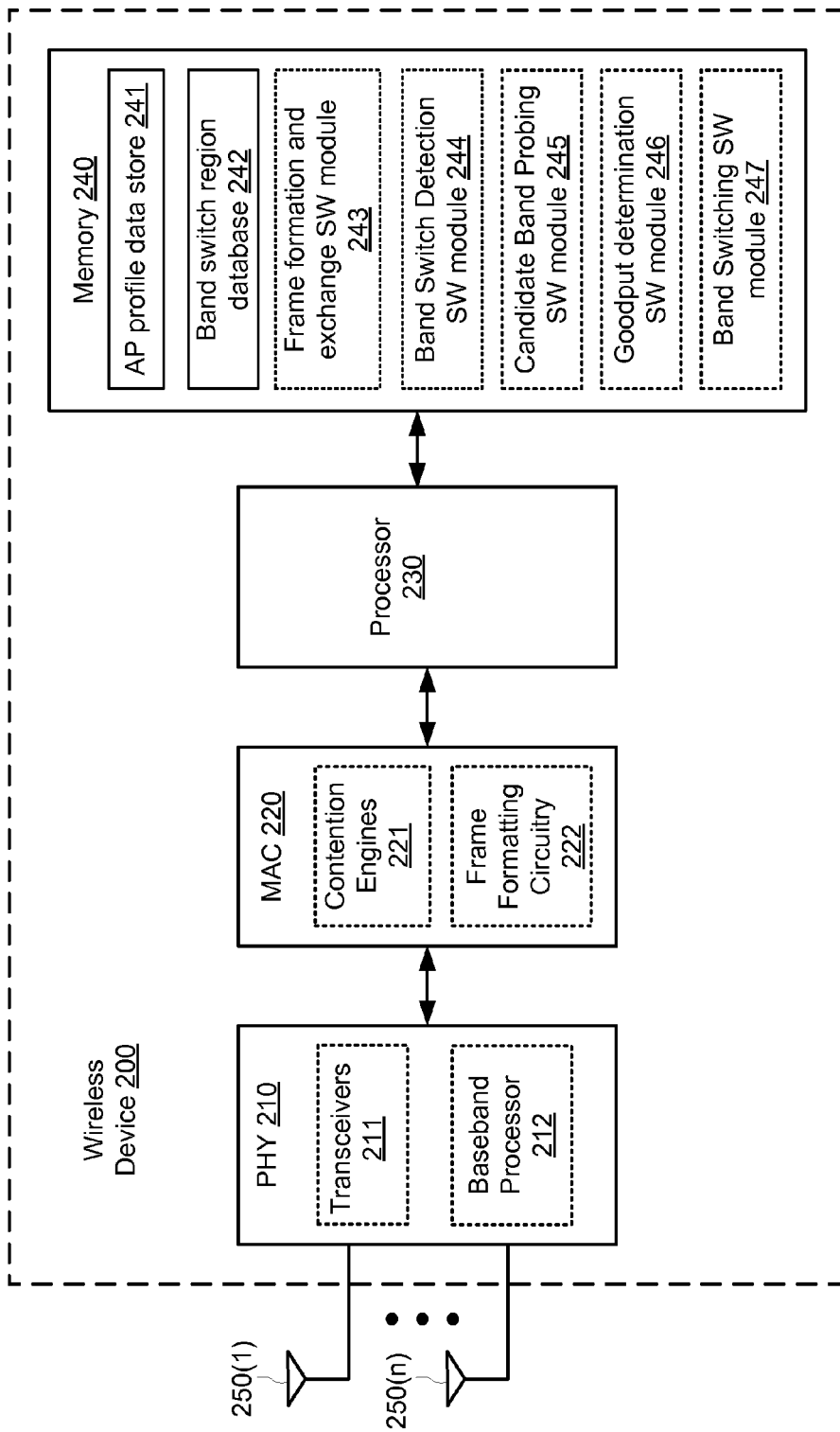
FIG. 2 shows a block diagram of a wireless station (STA) in accordance with example embodiments.

FIG. 2 shows an example wireless device 200 that may be an embodiment of one or more of the stations STA1-STA4 of FIG. 1. The wireless device 200 may include a PHY device 210 including at least a number of transceivers 211 and a baseband processor 212, may include a MAC device 220 including at least a number of contention engines 221 and frame formatting circuitry 222, may include a processor 230, may include a memory 240, and may include a number of antennas 250(1)-250($n$). The transceivers 211 may be coupled to antennas 250(1)-250($n$), either directly or through an antenna selection circuit (not shown for simplicity). The transceivers 211 may be used to transmit signals to and receive signals from AP 110 and/or other STAs (see also FIG. 1), and may be used to scan the surrounding environment to detect and identify nearby access points and/or other STAs (e.g., within wireless range of wireless device 200). Although not shown in FIG. 2 for simplicity, the transceivers 211 may include any number of transmit chains to process and transmit signals to other wireless devices via antennas 250(1)-250($n$), and may include any number of receive chains to process signals received from antennas 250(1)-250(n). Thus, for example embodiments, the wireless device 200 may be configured for MIMO operations. The MIMO operations may include single-user MIMO (SU-MIMO) operations and multi-user MIMO (MU-MIMO) operations.

The baseband processor 212 may be used to process signals received from processor 230 and/or memory 240 and to forward the processed signals to transceivers 211 for transmission via one or more of antennas 250(1)-250(n), and may be used to process signals received from one or more of antennas 250(1)-250(n) via transceivers 211 and to forward the processed signals to processor 230 and/or memory 240.

The contention engines 221 may contend for access to one more shared wireless mediums, and may also store packets for transmission over the one more shared wireless mediums. The wireless device 200 may include one or more contention engines 221 for each of a plurality of different access categories. For other embodiments, the contention engines 221 may be separate from MAC device 220. For still other embodiments, the contention engines 221 may be implemented as one or more software modules (e.g., stored in memory 240 or stored in memory provided within MAC device 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

For purposes of discussion herein, MAC device 220 is shown in FIG. 2 as being coupled between PHY device 210 and processor 230. For actual embodiments, PHY device 210, MAC device 220, processor 230, and/or memory 240 may be connected together using one or more buses (not shown for simplicity).

Memory 240 may include an AP profile data store 241 that stores profile information for a plurality of APs and/or STAs. The profile information for a particular AP may include information including, for example, the AP's location, service set identification (SSID) value, MAC address, channel information, RSSI values, goodput values, channel state information (CSI), timing information, supported data rates, supported frequency bands, connection history with wireless device 200, supported and/or recently used modulation and coding schemes, and any other suitable information pertaining to or describing the operation of the AP. Memory 240 may also include a band switch region database 242 to store information defining a number of band switch regions (each associated with a frequency band switch to a corresponding candidate frequency band). For some embodiments, the stored information for each band switch region may indicate a data rate or a range of data rates for the current frequency band that, if satisfied, may cause wireless device 200 to probe the candidate frequency band associated with the band switch region.

Memory 240 may also include a non-transitory computer-readable storage medium (e.g., one or more nonvolatile memory elements, such as EPROM, EEPROM, Flash memory, a hard drive, and so on) that may store the following software (SW) modules:

a frame formation and exchange software module 243 to facilitate the creation and exchange of frames (e.g., management frames, control frames, and data frames), for example, as described below with respect to FIG. 7;

a band switch detection software module 244 to determine whether channel conditions on a current frequency band fall within a band switch region, for example, as described below with respect to FIG. 7;

a candidate band probing software module 245 to probe one or more candidate frequency bands (e.g., by exchanging data with one or more other wireless devices on the candidate frequency bands), for example, as described below with respect to FIG. 7;

a goodput determination software module 246 to estimate the goodput of one or more candidate frequency bands (e.g., based on probing the one or more candidate frequency bands), for example, as described below with respect to FIG. 7; and a band switching software module 247 to selectively switch an operating frequency of wireless device 200 from a current frequency band to a selected candidate frequency band based at least in part on the estimated goodput value(s), for example, as described below with respect to FIG. 7.

Each software module includes instructions that, when executed by processor 230, may cause wireless device 200 to perform the corresponding functions. The non-transitory computer-readable medium of memory 240 thus includes instructions for performing all or a portion of the operations of the method of FIG. 7.

Processor 230, which is coupled to transceivers 211 and memory 240, may be any one or more suitable processors capable of executing scripts or instructions of one or more software programs stored in wireless device 200 (e.g., within memory 240). For example, processor 230 may execute the frame formation and exchange software module 243 to facilitate the creation and exchange of frames (e.g., management frames, control frames, and data frames). Processor 230 may also execute the band switch detection software module 244 to determine whether channel conditions on a current frequency band fall within a band switch region. Processor 230 may also execute the candidate band probing software module 245 to probe one or more candidate frequency bands (e.g., by exchanging data with one or more other wireless devices on the candidate frequency bands). Processor 230 may also execute the goodput determination software module 246 to estimate the goodput of one or more candidate frequency bands (e.g., based on probing the one or more candidate frequency bands). Processor 230 may also execute the band switching software module 247 to selectively switch an operating frequency of wireless device 200 from the current frequency band to the selected candidate frequency band based at least in part on the estimated goodput value(s).

As mentioned above, a wireless device such as wireless device 200 may select an MCS value for transmitting data to other wireless devices (e.g., AP 110 of FIG. 1) on a wireless channel. The wireless device 200 may estimate the effective data rate of the wireless channel based at least in part on the MCS value, the channel bandwidth, and the guard interval. Because the channel bandwidth and the guard interval may be known (e.g., relatively constant) values, the MCS value used by the wireless device 200 may provide an accurate indication of the data rate of the wireless channel. Accordingly, for at least some example embodiments described herein, MCS values may be used to determine whether channel conditions of a current frequency band fall within one or more band switch regions, and the band switch regions may be defined using one or more MCS values.

Figure 3:
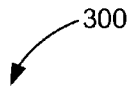
FIG. 3 shows a table of modulation and coding scheme (MCS) values in accordance with the IEEE 802.11n standards.

FIG. 3 is a table 300 showing MCS values in accordance with the IEEE 802.11n standards. As discussed above, MCS values used by wireless devices operating according to the IEEE 802.11n standards may be signaled in a 7-bit portion of an HT Signal field of a frame. More specifically, one of 32 possible MCS values may be selected to indicate the number of spatial streams, the modulation type, and the coding rate used by wireless device 200. Further, as depicted in table 300, the data rate of a wireless channel may be determined from the MCS value, the channel bandwidth, and the guard interval (GI).

Figure 4:
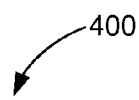
FIG. 4 shows a table of some MCS values, for one spatial stream, in accordance with the IEEE 802.11ac standards.

FIG. 4 is a table 400 showing MCS values for a single spatial stream in accordance with the IEEE 802.11ac standards. As discussed above, MCS values used by wireless devices operating according to the IEEE 802.11 ac standards may be signaled in a 4-bit portion of the VHT Signal field(s) of a frame. More specifically, one of 9 possible MCS values may be selected to indicate the modulation type and the coding rate used by wireless device 200. The number of spatial streams per wireless device may be specified elsewhere in the VHT Signal field(s) of a frame. Further, as depicted in table 400, the data rate of a wireless channel may be determined from the MCS value, the channel bandwidth, and the guard interval (GI).

When first initialized, wireless device 200 selects an initial frequency band for operation. For some embodiments, wireless device 200 may scan or probe a number of supported frequency bands sequentially (e.g., beginning with the highest frequency band and proceeding to lower frequency bands), and then select the first frequency band that provides an acceptable goodput as the initial operating frequency band. The acceptable goodput may be a goodput value that exceeds a threshold goodput value. For each of the probed frequency bands, wireless device 200 may receive beacon frames and/or other management frames (e.g., from one or more APs) and, in response thereto, estimate channel conditions or data rates of the corresponding frequency band. As mentioned above, the channel conditions or data rates may be estimated using RSSI values, PER values (or other indicators of interference), MCS values, and/or the number of active wireless devices on the corresponding frequency band. The channel conditions or data rates may also be estimated using data exchanges with other wireless devices and/or using channel sounding operations.

For other embodiments, wireless device 200 may scan or probe all supported frequency bands, and then select the frequency band having the best channel conditions or the highest data rate as the initial frequency band for operation.

After the initial frequency band is selected, wireless device 200 may use any suitable intra-band rate adaption techniques to select an MCS value that provides the highest data rates or the best goodput. The wireless device 200 may then exchange data with other wireless devices on the current frequency band using the selected MCS value. Thereafter, wireless device 200 may monitor the current frequency band for changing (e.g., deteriorating) channel conditions that may cause the wireless device 200 to consider switching operation from the current frequency band to another frequency band (e.g., to a selected one of a number of different candidate frequency bands).

As mentioned above, wireless device 200 may store (e.g., in band switch region database 242) information defining one or more band switch regions, where the information defining each band switch region may indicate a data rate or a range of data rates for the current frequency band that, if satisfied by current channel conditions, may allow the wireless device 200 to probe an associated candidate frequency band. Each band switch region (BSR) may be represented as $BSR_i(k)$ such that if the current channel conditions fall within a given $BSR_i(k)$, then wireless device 200 may consider a band switch from a current frequency band i to a candidate frequency band k.

The wireless device 200 may continually or periodically determine whether channel conditions of the current frequency band fall within one or more band switch regions. If the current channel conditions do not fall within any of the band switch regions, then wireless device 200 may continue operating on the current frequency band. Conversely, if the current channel conditions fall within a band switch region, then wireless device 200 may consider switching from the current frequency band to a candidate frequency band associated with the "matching" band switch region. More specifically, if the current channel conditions fall within a given band switch region, then wireless device 200 may selectively probe the associated candidate frequency band to estimate the goodput value of the candidate frequency band.

Figure 5A:
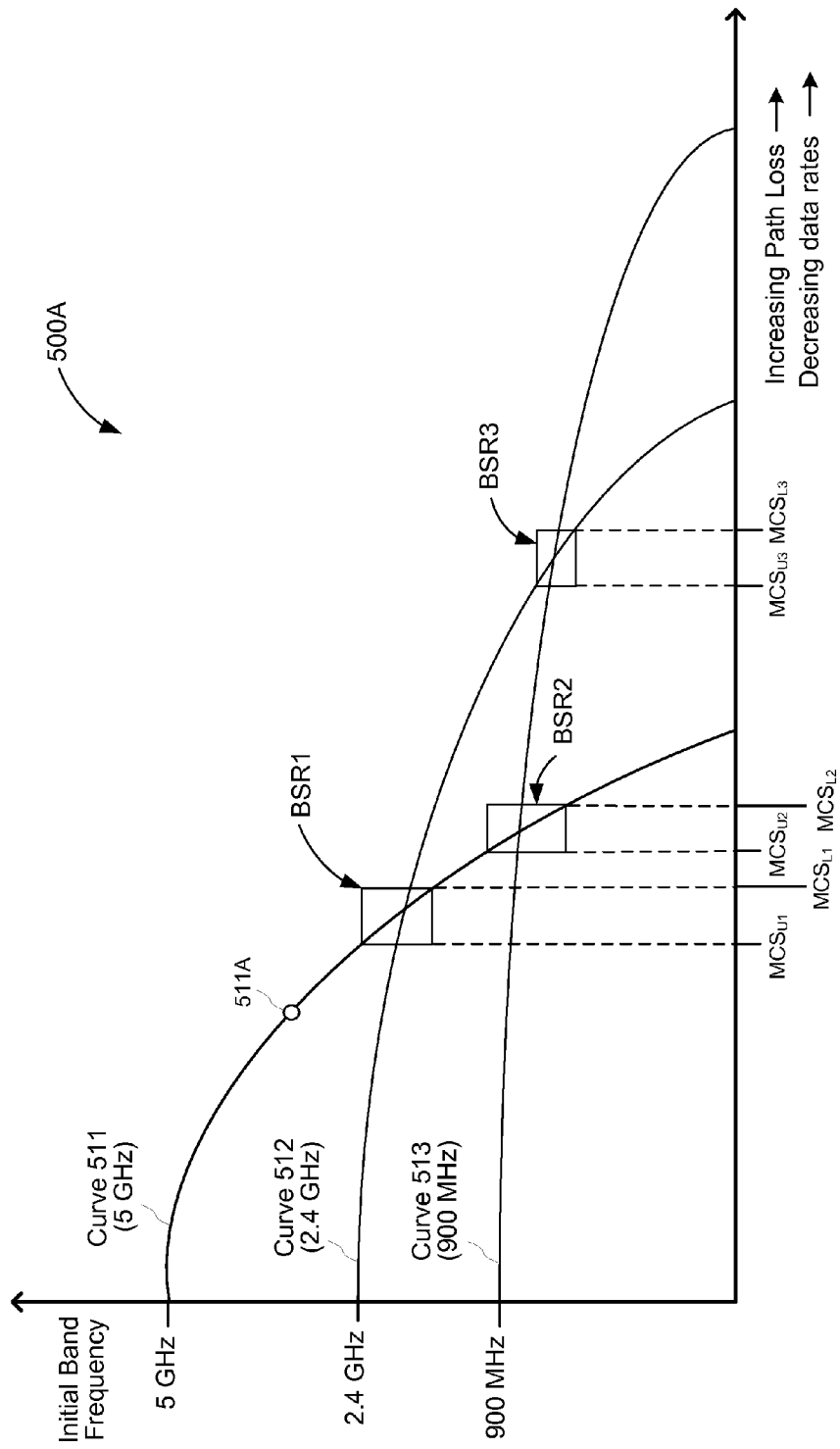
FIG. 5A is a plot of example channel condition curves and band switch regions in accordance with example embodiments.

FIG. 5A is a plot 500A of example channel condition curves and band switch regions in accordance with example embodiments. For the example plot 500A, MCS values are used to define the band switch regions, and are also used to determine whether current channel conditions fall within any of the band switch regions. As described above, for other embodiments, RSSI values, PER values, and/or any other data rate or transmission speed metric may be used to define the band switch regions.

The plot 500A of FIG. 5A is shown to include channel condition curves and band switch regions for a 900 MHz frequency band, a 2.4 GHz frequency band, and a 5 GHz frequency band. More specifically, the plot 500A depicts a channel condition curve 511 for the 5 GHz frequency band, a channel condition curve 512 for the 2.4 GHz frequency band, and a channel condition curve 513 for the 900 MHz frequency band. The y-axis of the plot 500A indicates an initial frequency for the frequency bands, and the x-axis indicates path loss and data rates. Path loss increases along the x-axis away from the origin, and data rates decrease along the x-axis away from the origin. Thus, as a point on any of the channel condition curves 511-513 moves away from the origin, the path loss (e.g., as may be indicated by PER values) increases and data rates (e.g., as may be indicated by MCS values) decrease.

The intersection of two channel condition curves may indicate points at which expected data rates for the two corresponding frequency bands are substantially the same. For example, the intersection of channel condition curves 511 and 512 may indicate the point at which the expected data rate for the 5 GHz frequency band is substantially the same as the expected data rate for the 2.4 GHz frequency band.

The plot 500A also depicts three band switch regions BSR1-BSR3. The first band switch region BSR1 is positioned at an intersection of the 5 GHz channel condition curve 511 and the 2.4 GHz channel condition curve 512, and may be used by wireless device 200 to selectively switch between the 5 GHz frequency band and the 2.4 GHz frequency band. The second band switch region BSR2 is positioned at an intersection of the 5 GHz channel condition curve 511 and the 900 MHz channel condition curve 513, and may be used by wireless device 200 to selectively switch between the 5 GHz frequency band and the 900 MHz frequency band. The third band switch region BSR3 is positioned at an intersection of the 2.4 GHz channel condition curve 512 and the 900 MHz channel condition curve 513, and may be used by wireless device 200 to selectively switch between the 2.4 GHz frequency band and the 900 MHz frequency band.

The band switch regions BSR1-BSR3 of FIG. 5A are defined using MCS values. For example, the first band switch region BSR1 is defined by an upper MCS boundary level ($MCS_{U1}$) and a lower MCS boundary level ($MCS_{L1}$), the second band switch region BSR2 is defined by an upper MCS boundary level ($MCS_{U2}$) and a lower MCS boundary level ($MCS_{L2}$), and the third band switch region BSR3 is defined by an upper MCS boundary level ($MCS_{U3}$) and a lower MCS boundary level ($MCS_{L3}$). Thus, for at least some embodiments, each pair of upper and lower MCS boundary levels may indicate a range of data rates (or channel conditions) associated with a corresponding one of the band switch regions.

For the example operation described herein, wireless device 200 is currently operating on the 5 GHz frequency band, and thus the MCS value used by wireless device 200 for data transmissions may indicate an operating point of wireless device 200 on the 5 GHz channel condition curve 511. For the example plot 500A of FIG. 5A, the operating point of wireless device 200 is located at a first position 511A on the channel conditions curve 511. The wireless device 200 may continually monitor the current MCS value ($MCS_{current}$) so that the operating point of wireless device 200 may be updated in response to any changes in the MCS value. For example, if the value of $MCS_{current}$ decreases (which may indicate deteriorating channel conditions), then the operating point may move along the channel condition curve 511 in a direction corresponding to increased path loss (e.g., along the x-axis away from the origin). Conversely, if the value of $MCS_{current}$ increases (which may indicate improving channel conditions), then the operating point may move along the channel condition curve 511 in a direction corresponding to decreased path loss (e.g., along the x-axis towards the origin).

The wireless device 200 may determine whether current channel conditions on the 5 GHz frequency band fall within one or more band switch regions by comparing $MCS_{current}$ with at least one of the MCS boundary levels that define each of the band switch regions. For example, the wireless device 200 may determine whether its operating point falls within the first band switch region BSR1 by comparing $MCS_{current}$ with $MCS_{U1}$ and/or $MCS_{L1}$, may determine whether its operating point falls within the second band switch region BSR2 by comparing $MCS_{current}$ with $MCS_{U2}$ and/or $MCS_{L2}$, and may determine whether its operating point falls within the third band switch region BSR3 by comparing $MCS_{current}$ with $MCS_{U3}$ and/or $MCS_{L3}$. For at least some embodiments, the decision to compare $MCS_{current}$ with the upper MCS boundary level or with the lower MCS boundary level (or both) of a given band switch region may be based at least in part on (1) whether the value of $MCS_{current}$ is increasing or decreasing and/or (2) whether the candidate frequency band occupies a higher frequency range or a lower frequency range than the current frequency band, as discussed in more detail below.

When probing the candidate frequency band, the wireless device 200 selects an initial MCS value to use for exchanging frames with another wireless device on the candidate frequency band. If a default MCS value for the candidate frequency band is stored in wireless device 200 (e.g., in memory 240), then the wireless device 200 may select the default MCS value as the initial MCS value when probing the candidate frequency band. Conversely, if no default MCS value is stored or known for the candidate frequency band (or if the default MCS value has not been used within a given period of time), then the wireless device 200 may select the highest MCS value associated with the candidate frequency band for the probing operations.

For some embodiments, the wireless device 200 may, for any given MCS value, probe the candidate frequency band for at least a period of time sufficient for the MCS to stabilize. Then, after the probing operation is complete, the wireless device 200 may update the stored default MCS value with the stabilized MCS value. The wireless device 200 may also set a timer to indicate that a particular candidate frequency band has been probed recently, and that another candidate band should not be probed until the timer expires.

Figure 5B:
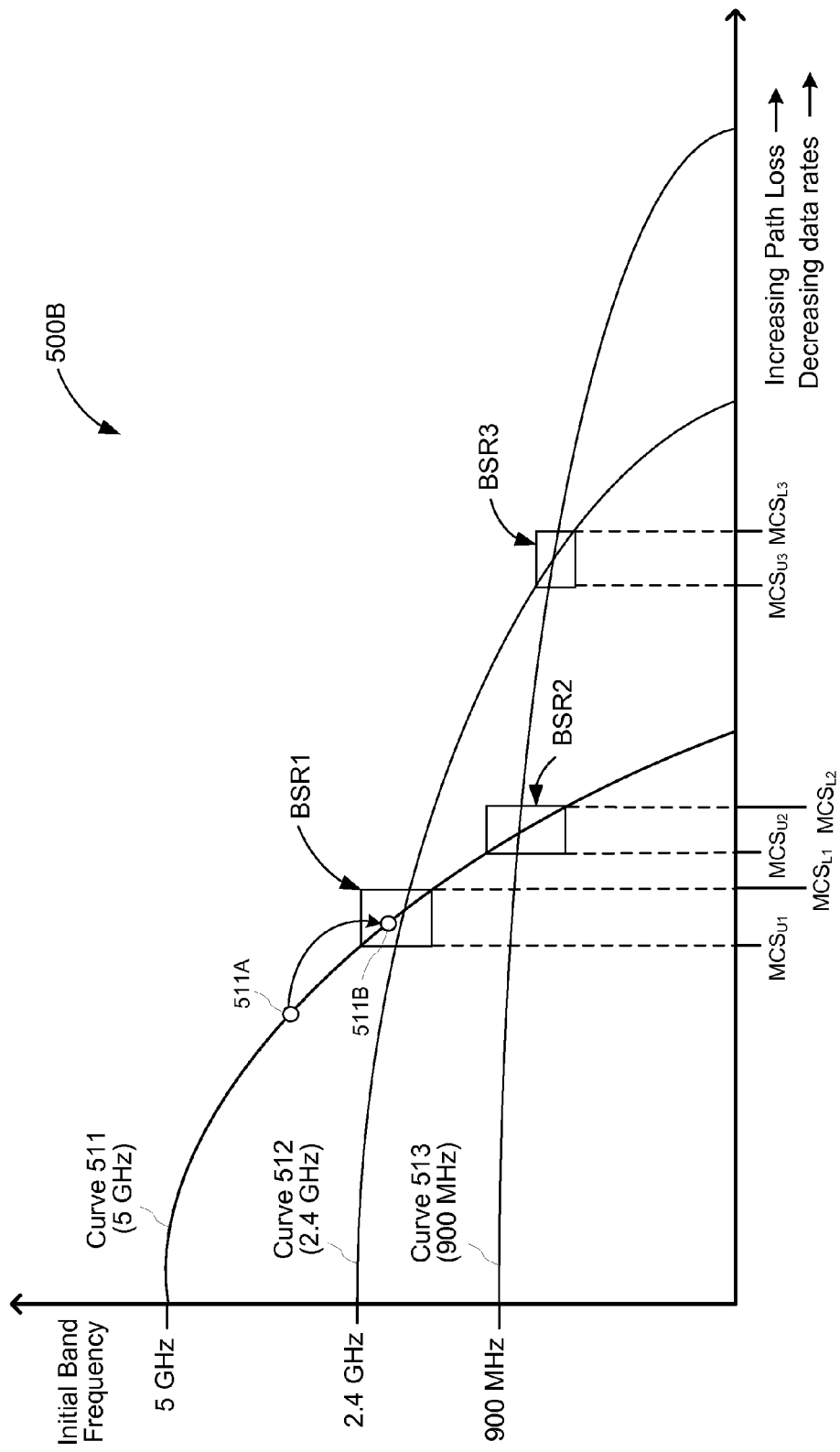
FIG. 5B is a plot depicting one possible frequency band switching operation for the example channel condition curves and band switch regions of FIG. 5A.

FIG. 5B is a plot 500B depicting a possible frequency band switching operation, for wireless device 200, from the 5 GHz frequency band to the 2.4 GHz frequency band. For the example plot 500B, the operating point of the wireless device 200 has moved along the 5 GHz channel conditions curve 511 from position 511A (e.g., corresponding to a first time $t_1$) to a position 511B (e.g., corresponding to a second time $t_2$). The positional change of the operating point along the channel conditions curve 511 may indicate that channel conditions of the 5 GHz frequency band have changed, and that it may be desirable to determine whether the channel conditions now fall within one or more band switch regions. As depicted in FIG. 5B, the position 511B of the operating point of wireless device 200 falls within BSR1 (e.g., the value of $MCS_{current}$ falls between $MCS_{U1}$ and $MCS_{L1}$). Thus, because the current channel conditions fall within BSR1, the wireless device 200 may selectively probe the candidate frequency band associated with BSR1—which for this example is the 2.4 GHz frequency band—to determine if the candidate frequency band offers better goodput than the 5 GHz frequency band.

For some embodiments, the wireless device 200 may begin probing the candidate frequency band of 2.4 GHz to estimate its goodput upon determining that the current channel conditions fall within BSR1. For other embodiments, the wireless device 200 may determine whether channel conditions are improving on the current frequency band of 5 GHz prior to probing the candidate frequency band of 2.4 GHz. For example, if the wireless device 200 determines that the data rates (e.g., which may be estimated by RSSI values, PER values, MCS values, and so on) of the 5 GHz frequency band have increased by more than a threshold amount during a given time period, then the wireless device 200 may not probe the candidate frequency band (even though the current channel conditions fall within BSR1). Otherwise, the wireless device 200 may probe the candidate frequency band to estimate its goodput. Thereafter, if the goodput of the 2.4 GHz frequency band is greater than the goodput of the 5 GHz frequency band, then the wireless device 200 may switch its operation to the 2.4 GHz frequency band. Conversely, if the goodput of the 2.4 GHz frequency band is not greater than the goodput of the 5 GHz frequency band, then the wireless device 200 may opt to remain on the 5 GHz frequency band.

Figure 5C:
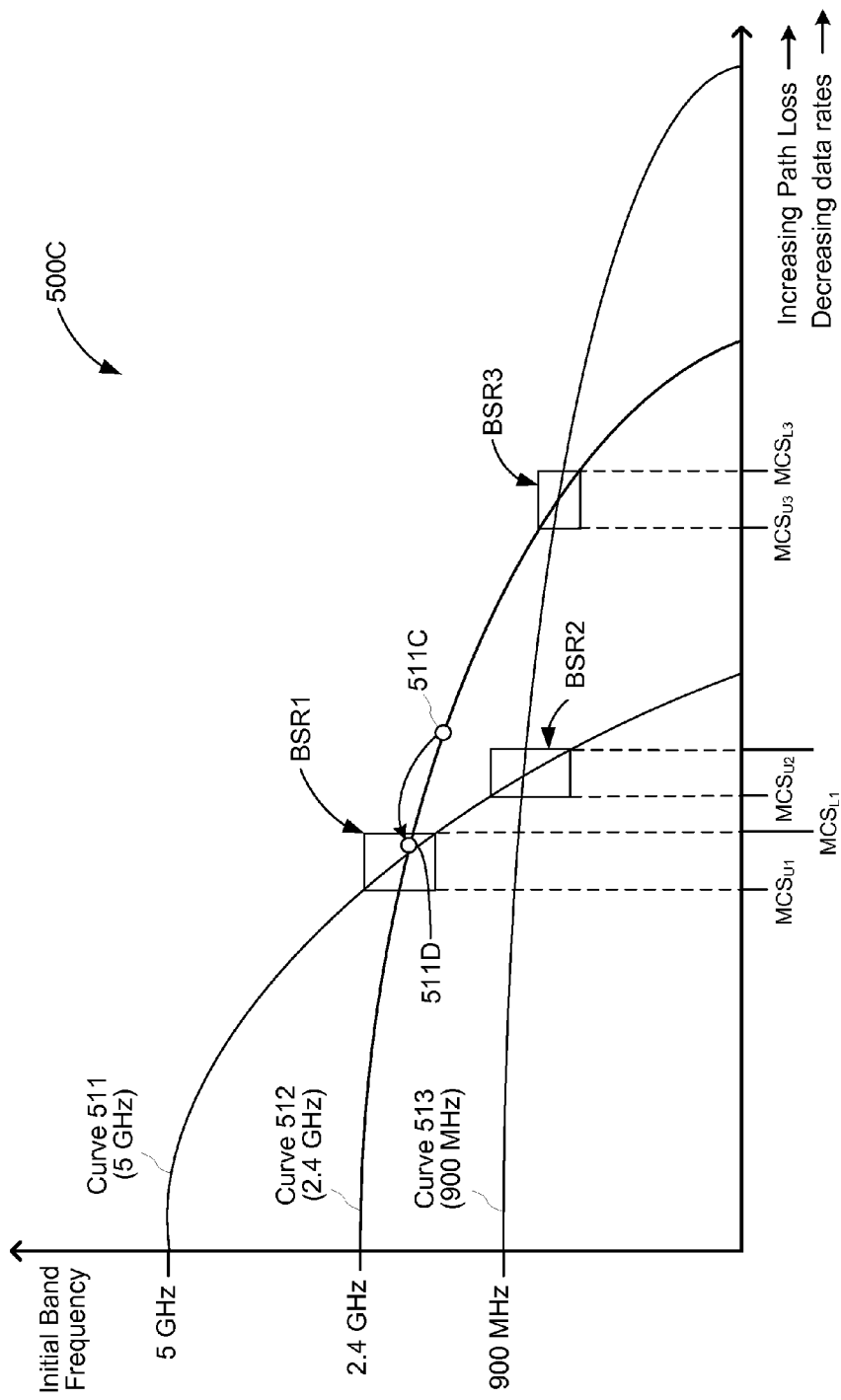
FIG. 5C is a plot depicting another possible frequency band switching operation for the example channel condition curves and band switch regions of FIG. 5A.

FIG. 5C is a plot 500C depicting a possible frequency band switching operation, for wireless device 200, from the 2.4 GHz frequency band back to the 5 GHz frequency band. For the example plot 500C, the operating point of the wireless device 200 has moved along the 2.4 GHz channel conditions curve 512 from position 511C (e.g., corresponding to a third time $t_3$) to a position 511D (e.g., corresponding to a fourth time $t_4$). The positional change of the operating point along the channel conditions curve 512 may indicate that channel conditions of the 2.4 GHz frequency band have changed, and that it may be desirable to determine whether the channel conditions now fall within one or more band switch regions. As depicted in FIG. 5C, the position 511D of the operating point of wireless device 200 again falls within BSR1 (e.g., the value of $MCS_{current}$ falls between $MCS_{L1}$ and $MCS_{U1}$). Thus, because the current channel conditions fall within BSR1, the wireless device 200 may selectively probe the candidate frequency band associated with BSR1—which for this example is the 5 GHz frequency band—to determine if the candidate frequency band offers better goodput than the 2.4 GHz frequency band.

As mentioned above, the decision to compare $MCS_{current}$ with the upper MCS boundary level or with the lower MCS boundary level (or both) of a given band switch region may be based at least in part on (1) whether the value of $MCS_{current}$ is increasing or decreasing and/or (2) whether the candidate frequency band occupies a higher frequency range or a lower frequency range than the current frequency band. For the example plot 500B of FIG. 5B, the data rate of the 5 GHz frequency band is decreasing or trending downward (e.g., as indicated by the change in operating point from position 511A to position 511B), and the candidate frequency band of 2.4 GHz occupies a lower frequency range than the current frequency band of 5 GHz. Because entry into BSR1 is triggered by the value of $MCS_{current}$ becoming less than $MCS_{U1}$, comparing $MCS_{current}$ with $MCS_{U1}$ may determine whether the current channel conditions fall within BSR1. Thus, for the example operation of FIG. 5B, it may not be necessary to compare $MCS_{current}$ with $MCS_{L1}$ to determine whether the current channel conditions fall within BSR1.

For the example plot 500C of FIG. 5C, the data rate of the 2.4 GHz frequency band is increasing or trending upward (e.g., as indicated by the change in operating point from position 511C to 511D), and the candidate frequency band of 5 GHz occupies a higher frequency range than the current frequency band of 2.4 GHz. Because entry into BSR1 is triggered by the value of $MCS_{current}$ becoming greater than $MCS_{L1}$, comparing $MCS_{current}$ with $MCS_{L1}$ may determine whether the current channel conditions fall within BSR1. Thus, for the example operation of FIG. 5C, it may not be necessary to compare $MCS_{current}$ with $MCS_{U1}$ to determine whether the current channel conditions fall within BSR1.

Figure 5D:
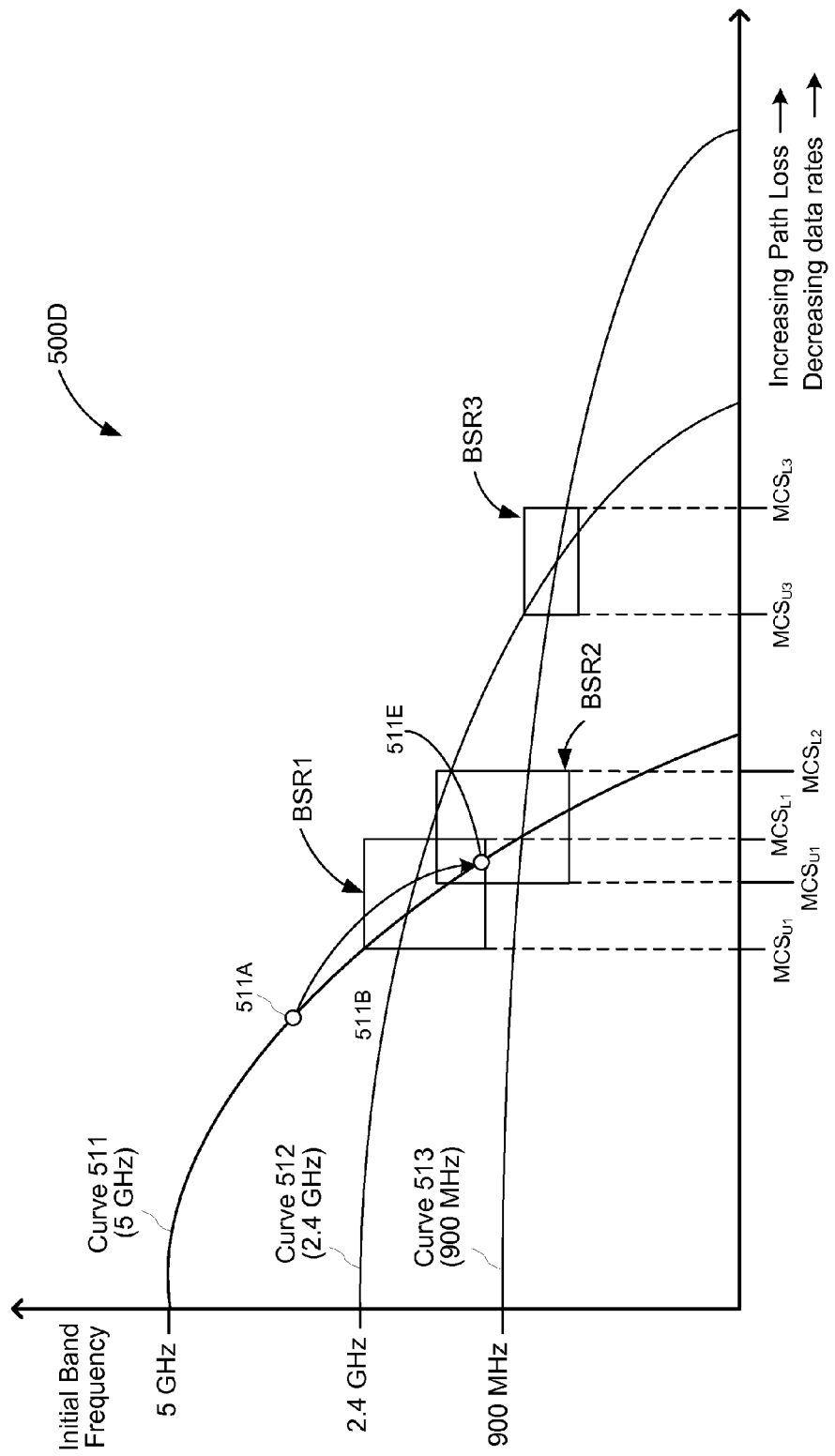
FIG. 5D is a plot depicting the example channel condition curves of FIG. 5A with overlapping band switch regions.

As described above, a given frequency band may share a BSR for each candidate frequency band to which the wireless device 200 may switch its operations, and channel conditions may fall within more than one BSR. For example, FIG. 5D is a plot 500D depicting a possible frequency band switching operation, for wireless device 200, from the 5 GHz frequency band to the 2.4 GHz frequency band or the 900 MHz frequency band. For the example plot 500D, the operating point of the wireless device 200 has moved along the 5 GHz channel conditions curve 511 from position 511A (e.g., corresponding to a fifth time $t_5$) to a position 511E (e.g., corresponding to a sixth time $t_6$). Here, the position 511E lies within both BSR1 and BSR2 (e.g., the value of $MCS_{current}$ falls between $MCS_{U1}$ and $MCS_{L2}$). Thus, because the current channel conditions fall within BSR1 and BSR2, the wireless device 200 may selectively probe candidate frequency bands of 2.4 GHz and 900 MHz.

For some embodiments, the wireless device 200 may be configured to selectively probe all candidate frequency bands associated with the matching BSRs, which for the example of FIG. 5D may allow wireless device 200 to selectively probe the 2.4 GHz and 900 MHz candidate frequency bands. For other embodiments, the wireless device 200 may selectively probe only the candidate frequency band that is adjacent in frequency to the current operating band, which for the example of FIG. 5D allows wireless device 200 to selectively probe only the 2.4 GHz frequency band (e.g., because the 2.4 GHz frequency band is adjacent in frequency to the 5 GHz frequency band, and the 900 MHz frequency band is not adjacent in frequency to the 5 GHz frequency band).

As mentioned above, the wireless device 200 may use trends in channel conditions to determine whether to probe a candidate frequency band associated with a matching band switch region. For one example, if channel conditions (e.g., as indicated by MCS values) on the current frequency band have improved by more than a threshold amount within a given time period, the wireless device 200 may decline to probe candidate frequency bands that occupy a lower frequency range than the current frequency band. More specifically, because lower-frequency signals typically have lower data rates than higher-frequency signals, switching to a lower-frequency band while data rates on the current frequency band are increasing is not likely to result in better goodput.

For another example, if channel conditions (e.g., as indicated by MCS values) on the current frequency band have deteriorated by more than a threshold amount within a given time period, the wireless device 200 may decline to probe candidate frequency bands that occupy a higher frequency range than the current frequency band. More specifically, because higher-frequency signals typically offer shorter wireless range than lower-frequency signals, switching to a higher-frequency band while channel conditions on the current frequency are deteriorating is not likely to result in better goodput.

The wireless device 200 may also store historical information regarding previously determined channel conditions and/or goodput values for one or more candidate frequency bands. For example, if the channel conditions and/or goodput of a given candidate frequency band were previously or historically determined to be below a threshold level, then the wireless device 200 may decline to select (or even probe) the given candidate frequency band even if current channel conditions fall within a band switch region associated with the given candidate frequency band.

The wireless device 200 may determine that its traffic has latency requirements below a threshold level, and that these requirements may be satisfied while operating on the 900 MHz frequency band (e.g., in accordance with the IEEE 802.11 ah standards). Because operating on the 900 MHz frequency band may consume less power than operating on the 2.4 GHz and 5 GHz frequency bands, it may be desirable for the wireless device 200 to operate on the 900 MHz frequency band if its traffic latency requirements may be satisfied on the 900 MHz frequency band.

As mentioned above, after wireless device 200 switches from a current frequency band to a selected candidate frequency band, it may be desirable to prevent the wireless device 200 from switching back to the previous frequency band based on relatively small and/or short-term changes in channel conditions. Further, if the goodput on the current frequency band and the goodput on the candidate frequency band are substantially similar (e.g., within a threshold level of each other), then the wireless device 200 may undesirably oscillate between the two frequency bands. To prevent undesirable oscillations between frequency bands, the wireless device 200 may modify the associated band switch region in a manner that provides hysteresis between frequency band switching. More specifically, after switching to a candidate frequency band, the wireless device 200 may apply a negative bias to the associated band switch region to prevent temporary changes in channel conditions from triggering a switch back to the previous frequency band. For at least some embodiments, the negative bias may expire after a time period (e.g., as measured by a timer or counter), and the band switch region may return to its original definition.

Figure 6:
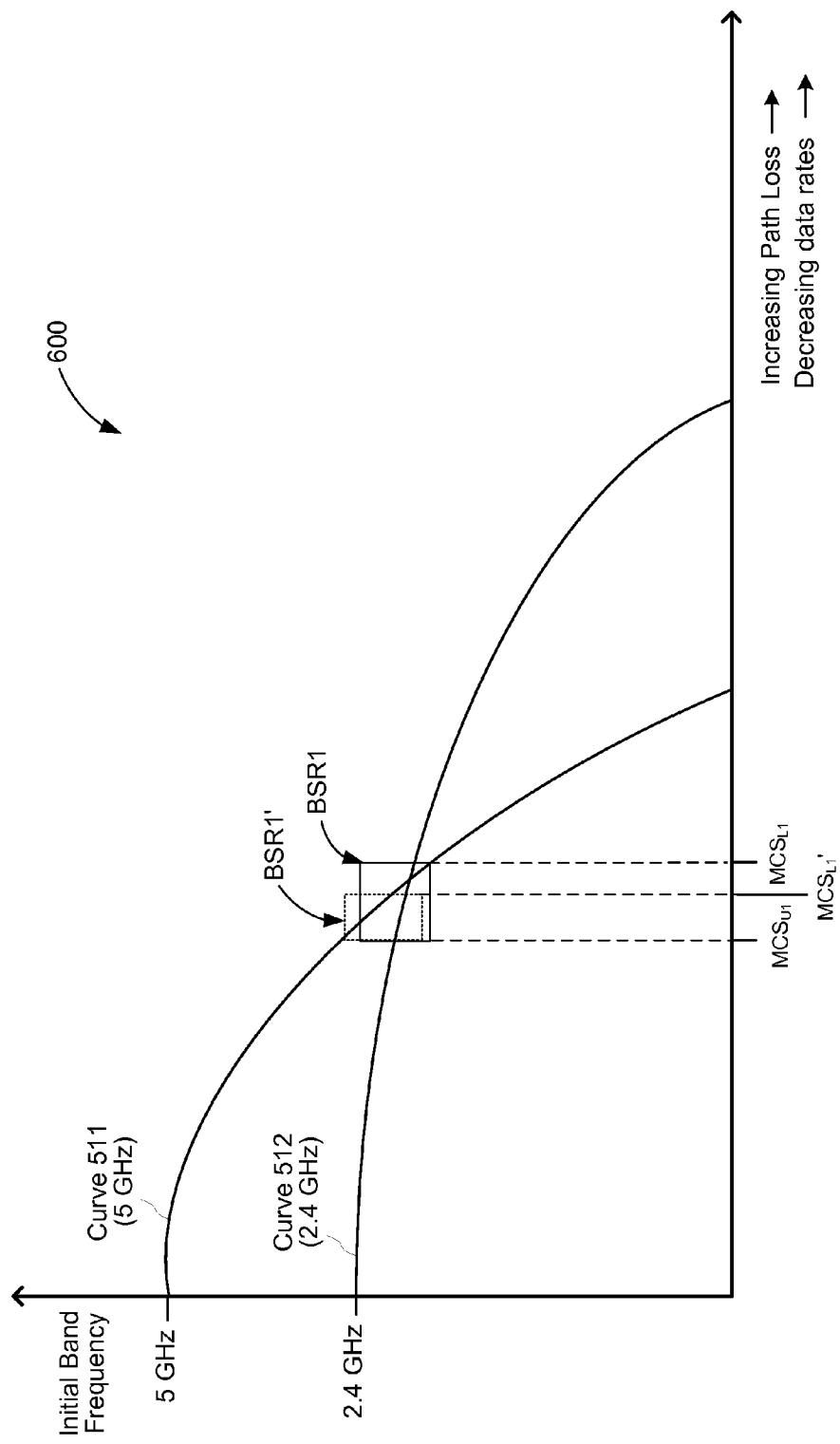
FIG. 6 is a plot depicting an example modification of one of the band switch regions of FIG. 5A in accordance with example embodiments.

FIG. 6 is an example plot 600 depicting application of a negative bias on BSR1 after wireless device 200 switches operation from the 5 GHz frequency band to the 2.4 GHz frequency band. Thus, for the example plot 600 of FIG. 6, the 2.4 GHz frequency band is the current frequency band, and the 5 GHz frequency band is the candidate frequency band (for simplicity, the 900 MHz channel conditions curve 513, BSR2, and BSR3 are not shown in FIG. 6). As discussed above with respect to FIG. 5A, BSR1 is initially defined by the upper MCS boundary level $MCS_{U1}$ and the lower MCS boundary level $MCS_{L1}$. After wireless device 200 switches from the 5 GHz frequency band to the 2.4 GHz frequency band, the lower bound of BSR1 may be changed from $MCS_{L1}$ to $MCS_{L1}'$ to form a modified band switch region BSR1', where $MCS_{L1}'=MCS_{L1}+\Delta$ and $\Delta$ is a positive value. Thus, as depicted in FIG. 6, entry into BSR1' from the 2.4 GHz channel conditions curve 512 is triggered by a greater MCS value (e.g., as compared with entry into BSR1 from the 2.4 GHz channel conditions curve 512), which in turn may prevent wireless device 200 from switching back to the 5 GHz frequency band in response to relatively small and/or short-term changes in channel conditions.

Figure 7:
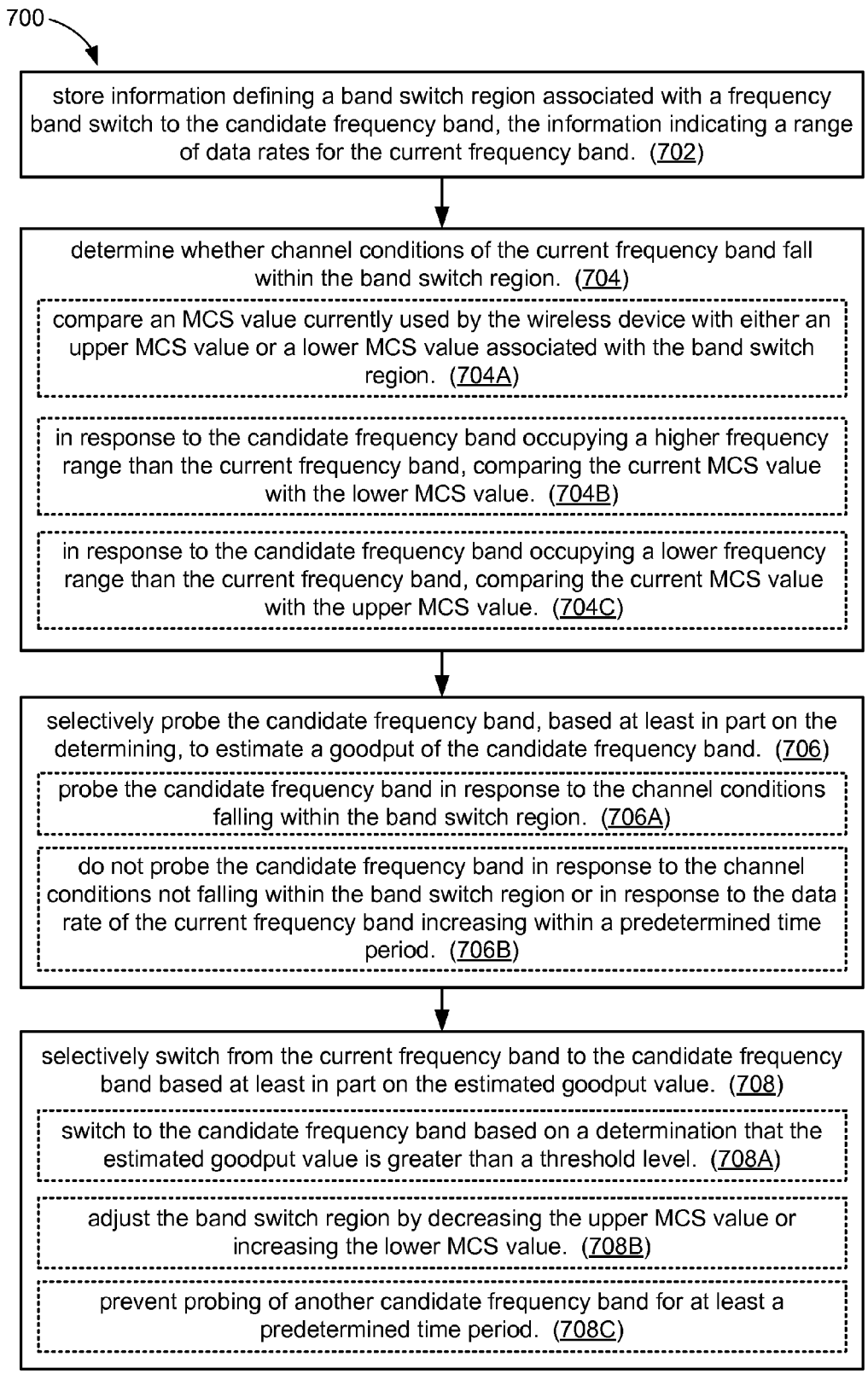
FIG. 7 shows an illustrative flow chart depicting an example operation for selectively switching an operating frequency of a wireless device between frequency bands in accordance with example embodiments.

FIG. 7 is an illustrative flowchart depicting an example operation 700 for selectively switching between frequency bands, in accordance with some embodiments. The example operation 700 may be performed a wireless device such the wireless device 200 depicted in FIG. 2, or by any one of STA1-STA4 depicted in FIG. 1. However, it is to be understood that operation 700 may be performed by other suitable wireless devices.

First, wireless device 200 may store (e.g., in band switch region database 242) information defining a band switch region associated with a frequency band switch to the candidate frequency band, the information indicating a data rate or a range of data rates for the current frequency band (702). For at least some embodiments, the current frequency band is one member of the group consisting of a 900 MHz frequency band, a 2.4 GHz frequency band, a 5 GHz frequency band, and a 60 GHz frequency band; and the candidate frequency band is another member of the group consisting of the 900 MHz frequency band, the 2.4 GHz frequency band, the 5 GHz frequency band, and the 60 GHz frequency band. Further, for at least some embodiments, the information is at least one member of the group consisting of modulation and coding scheme (MCS) values, received signal strength indicator (RSSI) values, and packet error rate (PER) values.

Next, the wireless device 200 may determine whether channel conditions of the current frequency band fall within the band switch region (704). To determine whether the current channel conditions fall within the band switch region, the wireless device 200 may compare an MCS value currently used by the wireless device 200 with either an upper MCS boundary level or a lower MCS boundary level associated with the band switch region (704A). More specifically, in response to the candidate frequency band occupying a higher frequency range than the current frequency band, then the wireless device 200 may compare the current MCS value with the lower MCS boundary level (704B). Conversely, in response to the candidate frequency band occupying a lower frequency range than the current frequency band, then the wireless device 200 may compare the current MCS value with the upper MCS boundary level (704C).

Next, the wireless device 200 selectively probes the candidate frequency band, based at least in part on the determining, to estimate a goodput value of the candidate frequency band (706). More specifically, the wireless device 200 may probe the candidate frequency band in response to the channel conditions falling within the band switch region (706A). The wireless device may 200 use intra-band rate adaption techniques to determine an appropriate MCS value for probing the candidate frequency band. The wireless device 200 may probe the selected candidate frequency band for at least a threshold period of time (e.g., to allow the MCS value to stabilize on the appropriate MCS value). After determining the appropriate MCS value, the wireless device 200 may associate the stabilized MCS value with the candidate frequency band (e.g., by storing the stabilized MCS value in band switch region database 242 of wireless device 200). If, after probing the candidate band, the wireless device 200 determines that the candidate frequency band's channel conditions are below a threshold value (e.g., indicating that the channel conditions are relatively poor), the wireless device 200 may store information (e.g., in band switch region database 242 of wireless device 200) indicating that the candidate frequency band is associated with relatively poor channel conditions.

Conversely, the wireless device 200 may not probe the candidate frequency band in response to the channel conditions not falling within the band switch region or in response to the data rate of the current frequency band increasing (e.g., by a threshold amount) within a predetermined time period (706B).

Next, the wireless device 200 selectively switches from the current frequency band to the candidate frequency band based at least in part on the estimated goodput value (708). For example, the wireless device 200 may switch to the candidate frequency band based on a determination that the estimated goodput value is greater than a threshold level (708A). The wireless device 200 may adjust the band switch region by decreasing the upper MCS boundary level or increasing the lower MCS boundary level (708B). For example, if the candidate frequency band occupies a lower range of frequencies than the current frequency band, then the wireless device 200 may increase the lower MCS boundary level; conversely, if the candidate frequency band occupies a higher range of frequencies than the current frequency band, then the wireless device 200 may decrease the upper MCS boundary level. The wireless device 200 may also prevent probing of another candidate frequency band for at least a predetermined time period after switching to the candidate frequency band (708C).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for selectively switching an operating frequency of a wireless device from a current frequency band to a candidate frequency band, the method comprising:
    storing, in the wireless device, information defining a band switch region associated with a frequency band switch to the candidate frequency band, the information indicating a range of data rates for the current frequency band;
    determining whether channel conditions of the current frequency band fall within the band switch region by comparing a modulation and coding scheme (MCS) value currently used by the wireless device with either an upper MCS boundary level or a lower MCS boundary level associated with the band switch region;
    selectively probing the candidate frequency band, based at least in part on the determining, to estimate a goodput value of the candidate frequency band; and
    selectively switching from the current frequency band to the candidate frequency band based at least in part on the estimated goodput value.

2. The method of claim 1, wherein the current frequency band is one member of the group consisting of a 900 MHz frequency band, a 2.4 GHz frequency band, a 5 GHz frequency band, and a 60 GHz frequency band, and the candidate frequency band is another member of the group consisting of the 900 MHz frequency band, the 2.4 GHz frequency band, the 5 GHz frequency band, and the 60 GHz frequency band.

3. The method of claim 1, wherein the comparing comprises:
    in response to the candidate frequency band occupying a higher frequency range than the current frequency band, comparing the current MCS value with the lower MCS boundary level; and
    in response to the candidate frequency band occupying a lower frequency range than the current frequency band, comparing the current MCS value with the upper MCS boundary level.

4. The method of claim 1, wherein the selectively switching comprises:
    switching to the candidate frequency band based on a determination that the estimated goodput value is greater than a threshold level; and
    adjusting the band switch region by decreasing the upper MCS boundary level or increasing the lower MCS boundary level.

5. The method of claim 1, wherein the selectively switching comprises:
    switching to the candidate frequency band based on a determination that the estimated goodput value is greater than a threshold level; and
    preventing probing of another candidate frequency band for at least a predetermined time period.

6. The method of claim 1, wherein the selectively probing comprises:
    selecting a candidate MCS value;
    exchanging a number of data packets, using the selected candidate MCS value, with another wireless device on the candidate frequency band; and
    deriving the estimated goodput value based at least in part on the exchanged data packets.

7. The method of claim 1, wherein the selectively probing comprises:
    preventing the probing of the candidate frequency band in response to a data rate of the current frequency band changing by more than a threshold amount within a predetermined time period.

8. A wireless device to selectively switch its operating frequency from a current frequency band to a candidate frequency band, the wireless device comprising:
    one or more processors; and
    a memory storing instructions that, when executed by the one or more processors, cause the wireless device to:
        store, in the wireless device, information defining a band switch region associated with a frequency band switch to the candidate frequency band, the information indicating a range of data rates for the current frequency band;
        determine whether channel conditions of the current frequency band fall within the band switch region by comparing a modulation and coding scheme (MCS) value currently used by the wireless device with either an upper MCS boundary level or a lower MCS boundary level associated with the band switch region;
        selectively probe the candidate frequency band, based at least in part on the determining, to estimate a goodput value of the candidate frequency band; and
        selectively switch from the current frequency band to the candidate frequency band based at least in part on the estimated goodput value.

9. The wireless device of claim 8, wherein the current frequency band is one member of the group consisting of a 900 MHz frequency band, a 2.4 GHz frequency band, a 5 GHz frequency band, and a 60 GHz frequency band, and the candidate frequency band is another member of the group consisting of the 900 MHz frequency band, the 2.4 GHz frequency band, the 5 GHz frequency band, and the 60 GHz frequency band.

10. The wireless device of claim 8, wherein execution of the instructions to compare causes the wireless device to:

in response to the candidate frequency band occupying a higher frequency range than the current frequency band, compare the current MCS value with the lower MCS boundary level; and in response to the candidate frequency band occupying a lower frequency range than the current frequency band, compare the current MCS value with the upper MCS boundary level.

11. The wireless device of claim 8, wherein execution of the instructions to selectively switch causes the wireless device to:

switch to the candidate frequency band based on a determination that the estimated goodput value is greater than a threshold level; and adjust the band switch region by decreasing the upper MCS boundary level or increasing the lower MCS boundary level.

12. The wireless device of claim 8, wherein execution of the instructions to selectively switch causes the wireless device to:

switch to the candidate frequency band based on a determination that the estimated goodput value is greater than a threshold level; and prevent probing of another candidate frequency band for at least a predetermined time period.

13. The wireless device of claim 8, wherein execution of the instructions to selectively probe causes the wireless device to:

select a candidate MCS value;

exchange a number of data packets, using the selected candidate MCS value, with another wireless device on the candidate frequency band; and derive the estimated goodput value based at least in part on the exchanged data packets.

14. The wireless device of claim 8, wherein execution of the instructions to selectively probe causes the wireless device to:

prevent the probing of the candidate frequency band in response to a data rate of the current frequency band changing by more than a threshold amount within a predetermined time period.

15. A non-transitory computer-readable medium storing instructions that, when executed by one or more processors of a wireless device, cause the wireless device to selectively change a frequency band of operation by performing operations comprising:

storing, in the wireless device, information defining a band switch region associated with a frequency band switch from a current frequency band to a candidate frequency band, the information indicating a range of data rates for the current frequency band;

determining whether channel conditions of the current frequency band fall within the band switch region by comparing a modulation and coding scheme (MCS) value currently used by the wireless device with either an upper MCS boundary level or a lower MCS boundary level associated with the band switch region;

selectively probing the candidate frequency band, based at least in part on the determining, to estimate a goodput value of the candidate frequency band; and selectively switching from the current frequency band to the candidate frequency band based at least in part on the estimated goodput value.

16. The non-transitory computer-readable medium of claim 15, wherein the current frequency band is one member of the group consisting of a 900 MHz frequency band, a 2.4 GHz frequency band, a 5 GHz frequency band, and a 60 GHz frequency band, and the candidate frequency band is another member of the group consisting of the 900 MHz frequency band, the 2.4 GHz frequency band, the 5 GHz frequency band, and the 60 GHz frequency band.

17. The non-transitory computer-readable medium of claim 15, wherein execution of the instructions for comparing causes the wireless device to perform operations further comprising:

in response to the candidate frequency band occupying a higher frequency range than the current frequency band, comparing the current MCS value with the lower MCS boundary level; and in response to the candidate frequency band occupying a lower frequency range than the current frequency band, comparing the current MCS value with the upper MCS boundary level.

18. The non-transitory computer-readable medium of claim 15, wherein execution of the instructions for selectively switching causes the wireless device to perform operations further comprising:

switching to the candidate frequency band based on a determination that the estimated goodput value is greater than a threshold level; and adjusting the band switch region by decreasing the upper MCS boundary level or increasing the lower MCS boundary level.

19. The non-transitory computer-readable medium of claim 15, wherein execution of the instructions for selectively switching causes the wireless device to perform operations further comprising:

switching to the candidate frequency band based on a determination that the estimated goodput value is greater than a threshold level; and preventing probing of another candidate frequency band for at least a predetermined time period.

20. The non-transitory computer-readable medium of claim 15, wherein execution of the instructions for selectively probing causes the wireless device to perform operations further comprising:

selecting a candidate MCS value;

exchanging a number of data packets, using the selected candidate MCS value, with another wireless device on the candidate frequency band; and deriving the estimated goodput value based at least in part on the exchanged data packets.

21. The non-transitory computer-readable medium of claim 15, wherein execution of the instructions for selectively probing causes the wireless device to perform operations further comprising:

preventing the probing of the candidate frequency band in response to a data rate of the current frequency band changing by more than a threshold amount within a predetermined time period.

22. A wireless device to selectively switch its operating frequency from a current frequency band to a candidate frequency band, the wireless device comprising:

means for storing, in the wireless device, information defining a band switch region associated with a frequency band switch to the candidate frequency band, the information indicating a range of data rates for the current frequency band;

means for determining whether channel conditions of the current frequency band fall within the band switch region by comparing a modulation and coding scheme (MCS) value currently used by the wireless device with either an upper MCS boundary level or a lower MCS boundary level associated with the band switch region;

means for selectively probing the candidate frequency band, based at least in part on the determining, to estimate a goodput value of the candidate frequency band; and means for selectively switching from the current frequency band to the candidate frequency band based at least in part on the estimated goodput value.

23. The wireless device of claim 22, wherein the current frequency band is one member of the group consisting of a 900 MHz frequency band, a 2.4 GHz frequency band, a 5 GHz frequency band, and a 60 GHz frequency band, and the candidate frequency band is another member of the group consisting of the 900 MHz frequency band, the 2.4 GHz frequency band, the 5 GHz frequency band, and the 60 GHz frequency band.

* * * * *